United States Patent [19]
Nakatani

[11] Patent Number: 5,309,171
[45] Date of Patent: May 3, 1994

[54] GRAPH DISPLAY DEVICE

[75] Inventor: Rintaro Nakatani, Tokyo, Japan

[73] Assignee: Seiko Instruments Inc., Tokyo, Japan

[21] Appl. No.: 433,304

[22] Filed: Nov. 8, 1989

[30] Foreign Application Priority Data

Nov. 9, 1988 [JP] Japan .................. 63-283052

[51] Int. Cl.$^5$ .................................. G09G 1/06
[52] U.S. Cl. .................................. 345/140; 345/156
[58] Field of Search ............. 340/721, 735; 364/521

[56] References Cited

U.S. PATENT DOCUMENTS

| | | | |
|---|---|---|---|
| 4,491,832 | 1/1985 | Tanaka | 340/721 |
| 4,527,155 | 7/1985 | Yamaki et al. | 340/721 |
| 4,529,978 | 7/1985 | Rupp | 340/735 |
| 4,555,700 | 11/1985 | Convis et al. | 340/721 |
| 4,616,336 | 10/1986 | Robertson et al. | 340/721 |
| 4,656,603 | 4/1987 | Dunn | 340/747 |
| 4,974,174 | 11/1990 | Kleinman | 364/521 |

OTHER PUBLICATIONS

The Newsroom-Pro, Springboard Software, Inc., Minn., Minn. 1986, pp. 30-32.

"Using 1-2-3", Que Corp., Carmel, Indiana, 1987, pp. 358, 359, 360, 361, 364-368.

Primary Examiner—Ulysses Weldon
Attorney, Agent, or Firm—Spensley Horn Jubas & Lubitz

[57] ABSTRACT

A graph display device designed to facilitate editing of measurement results, composed of a statement input unit for inputting a statement in the form of given characters, a position input unit for inputting a desired display position of the statement, a position adjustment unit, a storage unit for storing measurement results, a logically operating unit and a display unit. A statement inputted through the statement input unit is adjusted to a display position inputted through the position input unit by means of the position adjustment unit to output statement image data, and the logically operating unit superposes the statement image data and graph image data outputted from the storage unit to generate composite image data effective to enable the display unit to display a composite image which is composed of the graph image and the statement image associated with a specific point of the graph image.

6 Claims, 5 Drawing Sheets

GRAPH DISPLAY DEVICE

BACKGROUND OF THE INVENTION

The present invention relates to a graph display device for use with a measurement instrument.

Conventional measurement instruments are constructed such that, during analysis or processing of measured results, a statement such as a note, comment, remark and reference, composed of a sequence of characters, is inputted into the device and is displayed at a fixed position on a graph field which indicates the results of measurement.

FIG. 2 shows one example of a display in conventional measurement instrument such as, for example, a thermal analysis instrument. On a graph 9 illustrative of the results of the thermal analysis, a general statement 7 including measurement condition, etc., which have been set during the course of measurement and a specific statement 8 such as a remark which can be inputted by the operator at a desired time in the form of a sequence of characters are displayed at predetermined or fixed locations. A second row of the specific statement 8 specifically refers to a dehydration reaction at 194° C. on a TG (Thermogravimetry) signal curve 10 of the graph 9, and a third row of the specific statement 8 specifically refers to an oxidation reaction of carbon monoxide induced concurrently with a dissociation reaction at 552° C., appearing on a DTA (Differential Thermal Analysis) signal curve 11 of the graph 9.

When organizing or editing measurement results in the form of a report, specific statements are often written in the form of sequences of characters onto the graph which shows the results of the measurement. However, in the above-noted prior art, the specific statements are written in fixed locations of the graph field and therefore the correspondence between each statement and a related point or curve of the graph of the measurement results cannot be readily recognized. Especially, as can be appreciated from the FIG. 2 example, it would be most advisable to place respective specific statements in close relation to respective associated points which indicate the reactions referred to by the specific statements. Therefore, in the prior art, the individual specific statements are manually written into the graph each time when editing the reports.

SUMMARY OF THE INVENTION

An object of the present invention, therefore, is to facilitate the representation and arrangement of specific statements on a graph display. The above and other objects are achieved, according to the invention, by a device of the graph display type composed essentially of a storage unit for storing measurement results, a statement input for inputting a statement in the form of a group of given characters, a position input unit for inputting position data for the statement associated with the measurement results, a position adjustment unit connected to the statement input unit and to the position input unit for adjusting or setting the position of the statement on a display screen, a logically operating unit connected to the position adjustment unit and to the storage unit for synthesizing outputs from these two units with each other to generate synthesized image data, and a display unit connected to the logically operating unit for displaying, according to the synthesized image data, a combined image of the measurement results in the form of a graph and the statements in the form of the given characters positioned at defined locations on the image.

In operation, at first, a desired statement is inputted through the statement input unit and position data for the statement are inputted through the position input unit. Then, the outputs from the statement input unit and the position input unit are respectively applied to the position adjustment unit. The position adjustment unit adjusts or sets the position of the statement on a display screen and outputs corresponding statement image data. On the other hand, the storage unit selectively outputs desired measurement results in the form of corresponding graph image data. The logically operating unit receives the statement image data and the graph image data to effect logical operation between them and outputs composite image data to the display unit. By such operation, the display unit can display an image composed of the graph indicative of the selected measurement results and the statements at desired places designated by the inputted position data.

DESCRIPTION OF THE PREFERRED EMBODIMENTS

Figure 1:
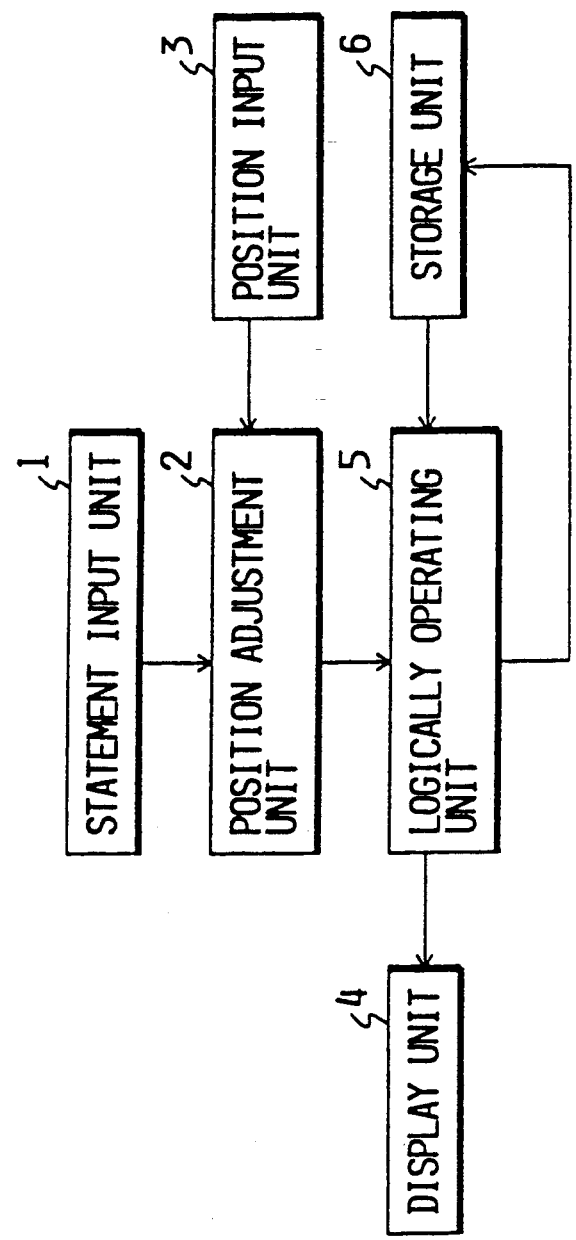
FIG. 1 is a schematic block diagram showing one embodiment of the present invention.

FIG. 1 is a schematic diagram showing one embodiment of the present invention in the form of a thermal analysis apparatus display device. A statement input unit 1 is provided to input statements composed of given characters during operation by the operator. A position input unit 3 is provided to input position data effective to designate the desired position of each statement on a display screen forming part of a display unit 4. A position adjustment unit 2 operates according to outputs of the statement input unit 1 and the position input unit 3 to adjust or set the position of each statement according to the position data so as to display the image of each statement at a designated location on the display screen. A storage unit 6 is provided to store the measurement results of thermal analysis and outputs data representing graph images of these results to a logically operating unit 5. The logically operating unit 5 carries out logical operations between the outputs of the position adjustment unit 2 and the storage unit 6 to superpose or couple statement image data and graph image data of the thermal analysis measurement results with each other, and the coupled image is displayed by display unit 4. Further, the output of the logically operating unit 5 is stored in the storage unit 6 such that the coupled image of the statement and the graph can be reproduced at any time.

Figure 3:
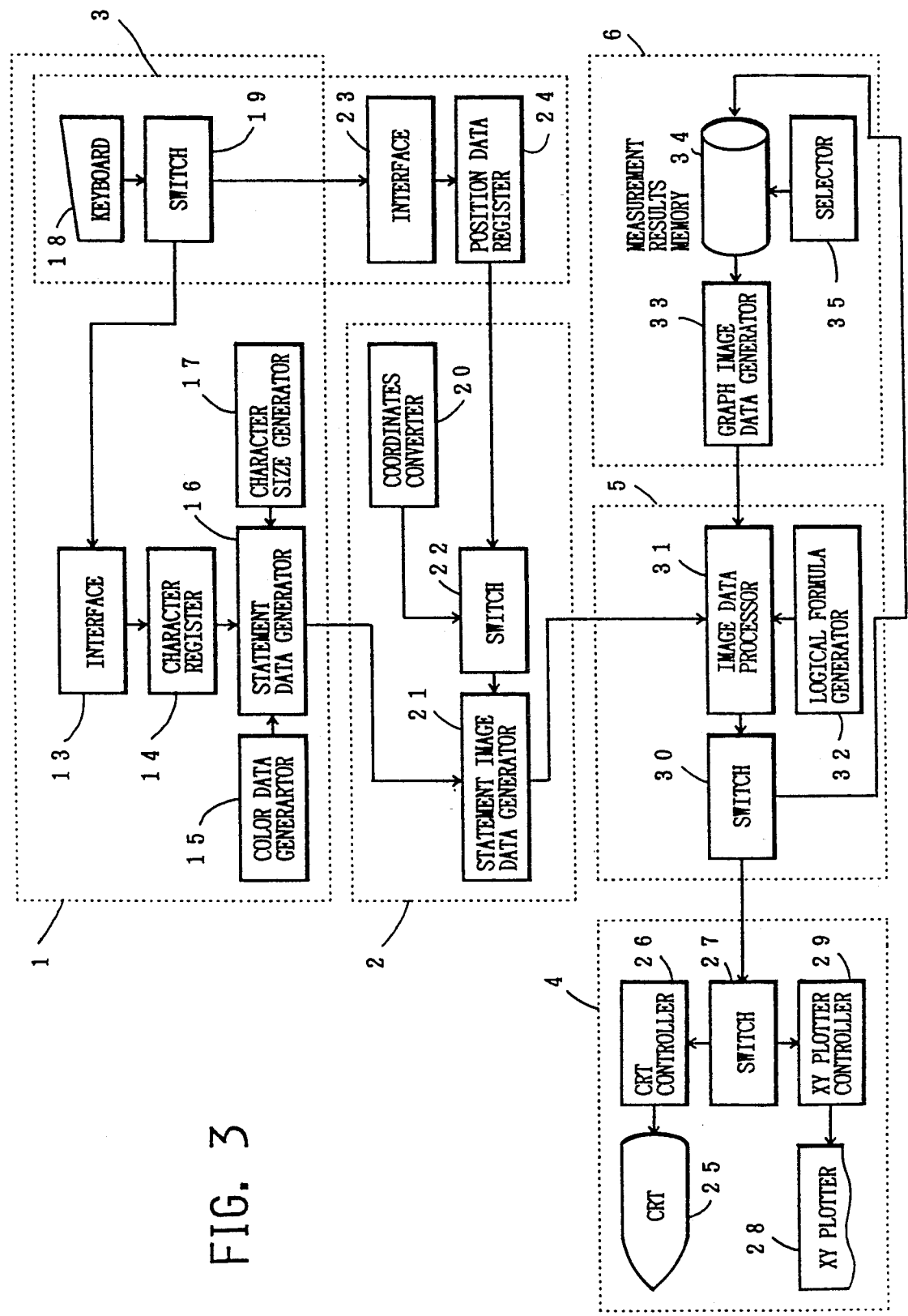
FIG. 3 is a detailed block diagram of one form of construction of the FIG. 1 embodiment.

FIG. 3 is a detailed block diagram of one form of construction of the FIG. 1 embodiment. The statement input unit 1 of the FIG. 3 embodiment is composed of a keyboard 18, a switch 19, a keyboard interface 13, a character register 14, color data generator 15, character size data generator 17, and a statement data generator 16. The operator inputs statements in the form of sequences of characters by means of the keyboard 18, and inputted character data representative of the statements is fed through the switch 19 to the keyboard interface 13. The switch 19 switches the keyboard 18 for use between the statement input unit 1 shown in FIG. 3 and the position input unit 3. The character register 14 operates to electronically register the character data fed from the keyboard interface 13. The registered character data is fed to the statement data generator 16 in which the character data is added or modified with color data generated by the color data generator 15 and with character size data generated by the character size data generator 17 to generate statement data which is fed to the position adjustment unit 2 of FIG. 3. The color data generator 15 and the character size data generator 17 can be controlled by the operator to modify or change the color and/or character size of the statement to be displayed.

The position input unit 3 shown in FIG. 3 is composed of the keyboard 18, the switch 19, a keyboard interface 23 and a position data register 24. Further, the position adjustment unit 2 shown in FIG. 3 is composed of a statement image data generator 21, a coordinates converter 20 and a switch 22. The position adjustment unit 2 operates by means of these components to effect positional adjustment of the statements in the display. In this regard, the position data register 24 registers, as a basis for position adjustment, two types of position data:

(1) absolute position data representative of the positions of general statements in terms of absolute coordinate values related to the display area of the display screen; and (2) relative position data representative of the positions of specific statements in terms of relative coordinates values related to the graph display of the measurement results.

Figure 2:
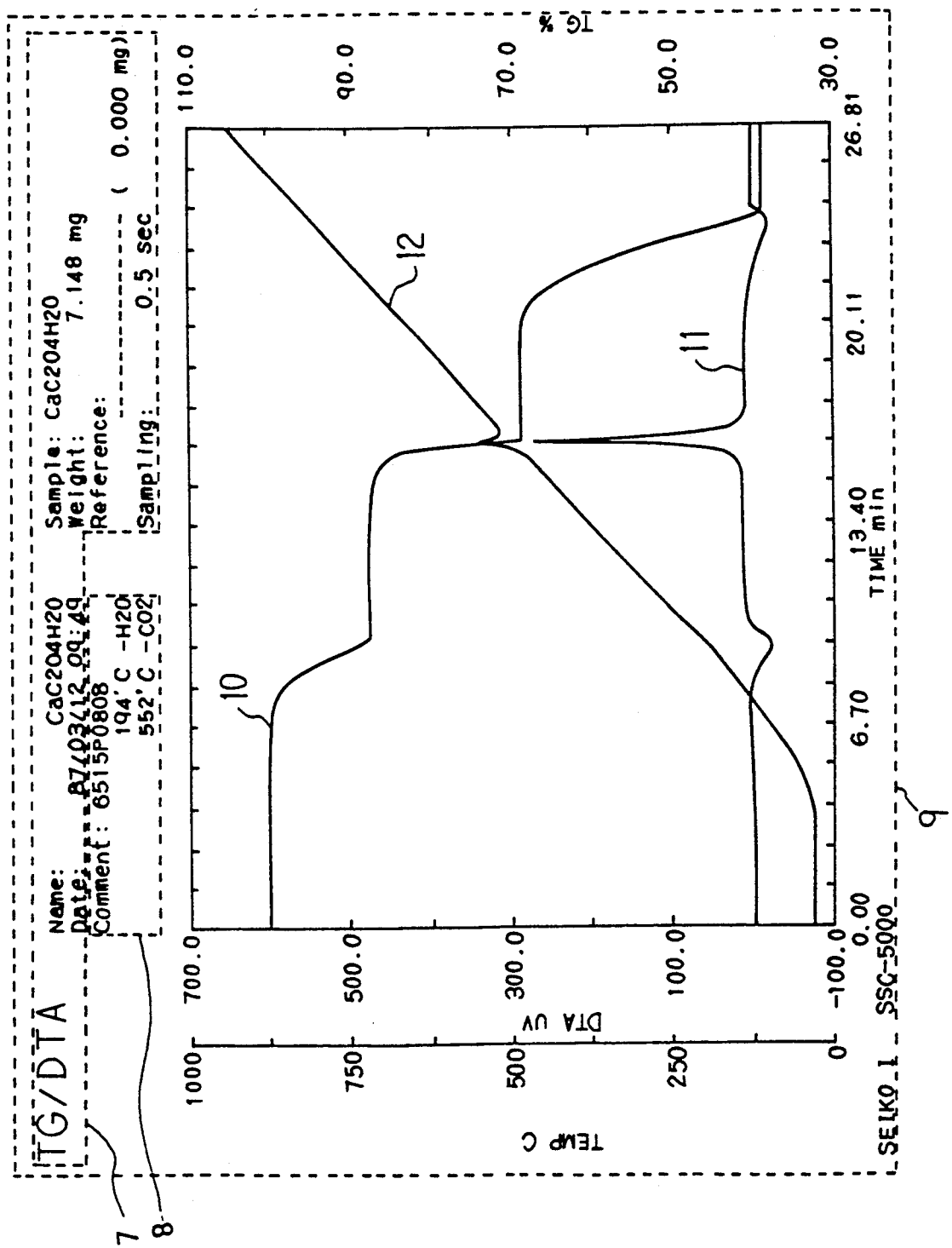
FIG. 2 is a pictorial view of a graph display according to the prior art.

For example, as shown in FIG. 2, the relative position data is given as a set of x-coordinate values in units of min and Y coordinate values, in units of $\mu V$ with regard to the graph of the DTA signal curve 11.

With regard to position data of type (1), the absolute position data which is related to general statements, the general statement is always displayed at a fixed position on the display designated by the absolute position data. With regard to position data of type (2), the relative position data which is related to specific statements, the position of each specific statement depends on the scale factor and area size of the individual graph which indicates the selected measurement results, and therefore the position of each specific statement is associated to the graph. Accordingly, the absolute position data is used to designate the position of the general statement which is related to the whole measurement results, and the relative position data is used to designate the position of each specific statement which is related to a specific point of the graph such as a specific reaction point in case of the FIG. 2 example.

The switch 22 is provided to switch between the relative position data and absolute position data to carry out the positional adjustment. Namely, the switch 22 operates in case of (1) absolute position data to directly couple the position data register 24 to the statement image data generator 21 through the switch 22, and operates in case of (2) relative position data to couple the position data register 24 to the coordinates converter 20 effective to convert the relative position data into the corresponding absolute data which is then fed through the switch 22 to the statement image data generator 21. The statement image data generator 21 operates based on the position data fed from the switch 22 and on the statement data fed from the statement data generator 16 and modified by the color and character size data for generating the statement image data.

The storage unit 6 of FIG. 3 is composed of a graph image data generator 33, a measurement results memory 34, and a selector 35. The memory 34 stores the measurement results, and the selector 35 is operated to select particular measurement results. The measurement results memory 34 outputs the selected measurement results to the graph image data generator 33 which generates graph image data representative of a graph image illustrative of the selected measurement results.

The logically operating unit 5 of FIG. 3 is composed of a switch 30, an image data processor 31 and a logical formula generator 32. The image data processor 31 operates according to logical formulas generated by the logical formula generator 32 to effect logical processing of the graph image data fed from the graph image data generator 33 and the statement image data fed from the statement image data generator 21 to thereby output superposed or composite image data through the switch 30 to either a subsequent switch 27 or the memory 34.

The display unit 4 of FIG. 3 is composed of a CRT 25, a CRT controller 26, the switch 27, an XY plotter 28 and an XY plotter controller 29. The composite image data fed from the image data processor 31 is switched by means of the switch 27 to either of the CRT 25 and the XY plotter 28. The CRT 25 is controlled by the CRT controller 26 to display a composite image composed of the graph image and the statement image. The XY plotter 28 is also controlled in similar manner by the XY plotter controller 29 to print the same composite image.

Figure 4:
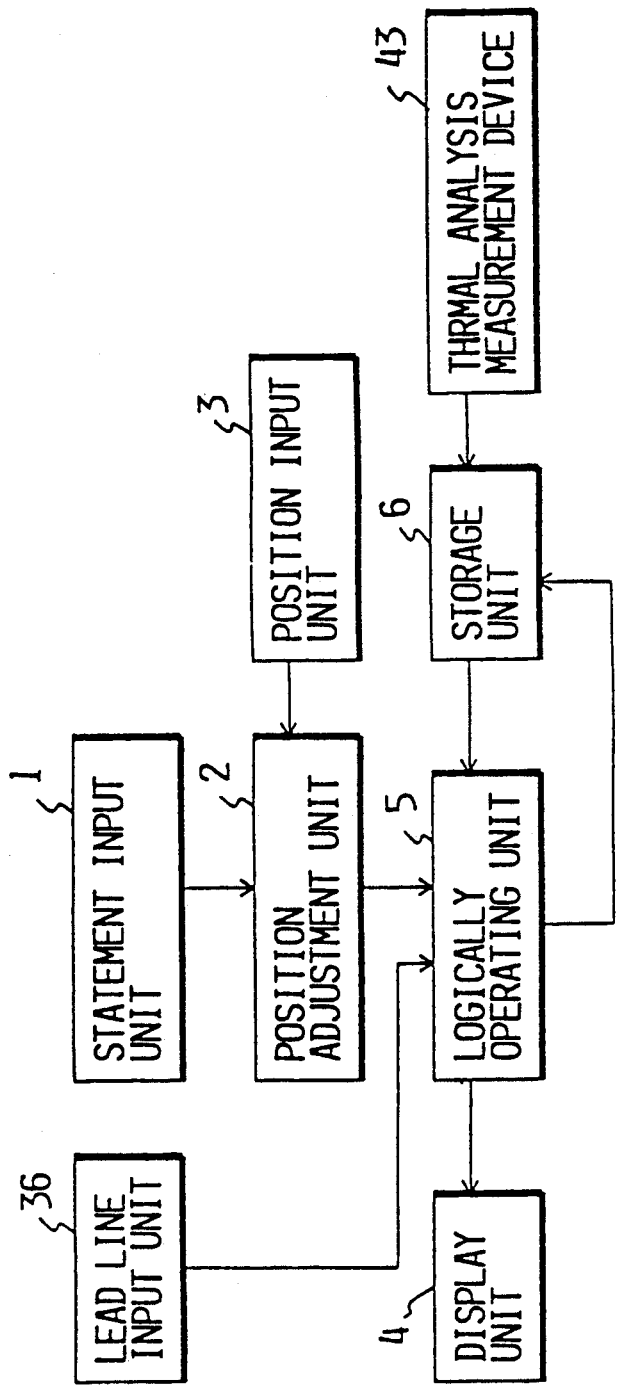
FIG. 4 is a schematic block diagram showing another embodiment of the present invention.

FIG. 4 is a block diagram showing another embodiment of the present invention in the form of the thermal analysis apparatus display device. Units identical to those of FIG. 1 are given the same reference numerals. A statement input unit 1 is operated by the operator to input at desired times statements in the form of given characters. A position input unit 3 is operated also by the operator to input position data effective to designate the position of the statement on a display. A lead line input unit 36 is also operated to input lead line data which supplement the statement and is operated to designate the position and line type of each lead line. A position adjustment unit 2 operates according to the output of the statement input unit 1 and the output of the position input unit 3 to effect adjustment so as to display the statement at the designated position. A storage unit 6 operates to feed measurement results of a thermal analysis stored therein or to feed measurement results of a thermal analysis which is measured by a thermal analysis measurement device 43, to a logically operating unit 5. The logically operating unit 5 carries out logic processing among the outputs from the position adjustment unit 2, the lead line input unit 36 and the storage unit 6 to superpose the statement image, the lead line image and the graph image of measurement results with one another to generate a composite image which can be displayed by a display unit 4. The composite image outputted from the logically operating unit 5 can be stored in the storage unit 6 so that the composite image can be reproduced at any time.

Figure 5:
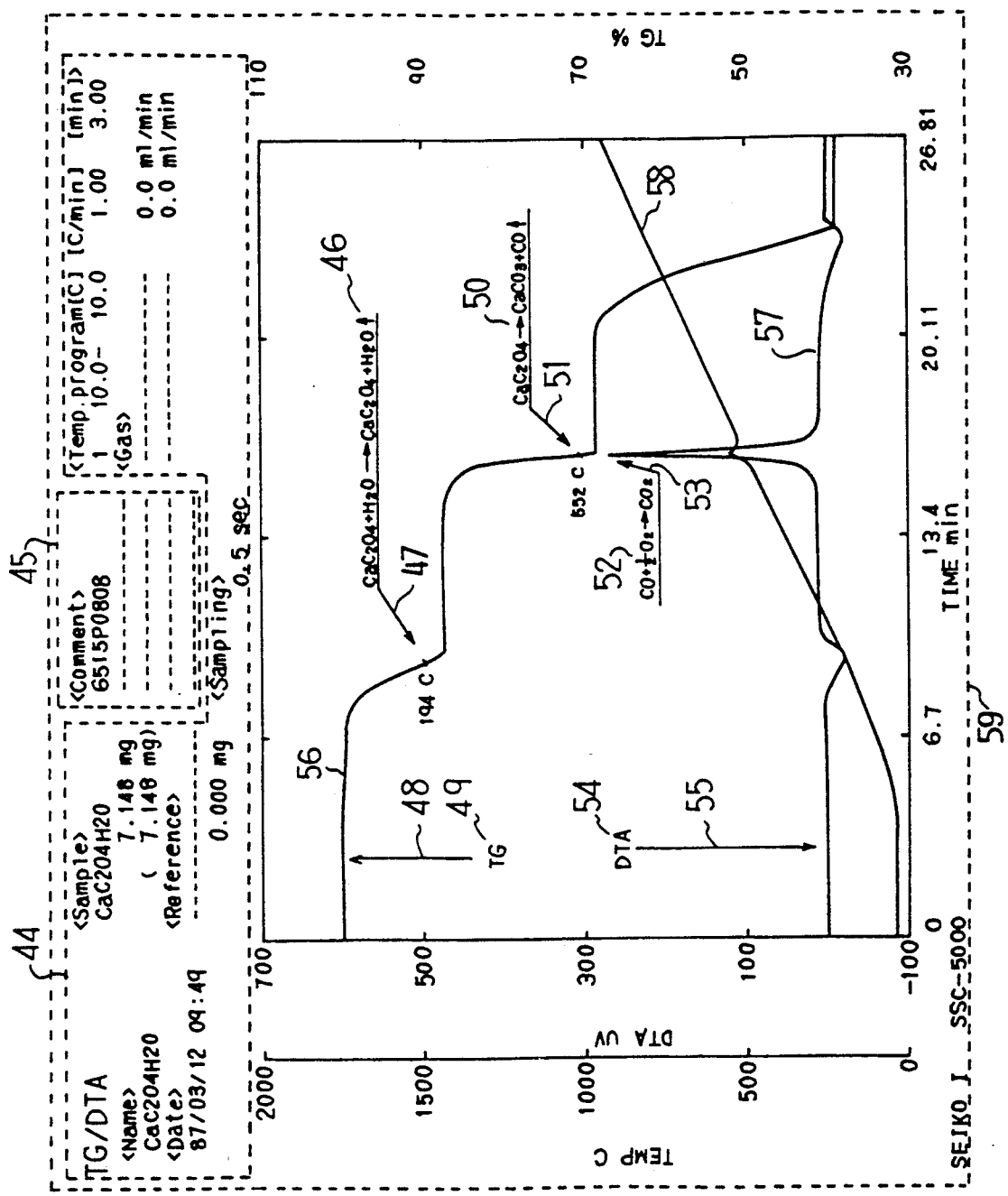
FIG. 5 is a pictorial view of a graph display produced by the FIG. 4 embodiment.

FIG. 5 shows an example of a composite image displayed by the FIG. 4 embodiment. A general statement 44 including measurement conditions set at the time of measurement is indicated on the graph display 59 which shows the results of a thermal analysis measurement. A specific statement 46 and its supplementary lead line 47 are displayed in place to indicate a dehydration reaction on a TG signal curve 56 at 194° C. Another specific statement 50 and its lead line 51 are displayed in place to indicate a dissociation reaction on the same TG signal curve 56 at 552° C. Still another specific statement 52 and its lead line 53 are displayed in place to indicate an oxidation reaction of carbon monoxide generated in the dissociation reaction on a DTA signal 57 at 552° C. Further, a lead line 48 together with a statement 49 is displayed to indicate the TG signal curve 56, and a lead line 55 together with a statement 54 is displayed to indicate the DTA signal line 57.

As described above, according to the present invention, a given specific statement can be displayed in the form of given characters on the graph of the measurement results in connection with a corresponding specific point of the graph. By such construction, preparation and editing of written reports can be facilitated with respect to measurement results.

This application relates to subject matter disclosed in Japanese Patent Application No. 63-283052, filed on Nov. 9, 1988, the disclosure of which is incorporated herein by reference.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

I claim:

1. A device for displaying measurement results in the form of a graph image on a display screen providing a display area, comprising:

a storage unit for storing measurement results and generating a graph image data indicative of the measurement results;

a statement input unit for inputting data representing statements which are to appear on the image in the form of given characters;

a position input unit for inputting data representing the position of each statement, said position data including absolute position data in terms of absolute coordinate values related to the display area of the display screen and relative position data in terms of relative coordinate values related to the graph display of the measurement results;

a position adjustment unit connected to said statement input unit and to said position input unit for providing data for adjusting the position of each statement on the graph image to be displayed to thereby generate statement image data by converting said relative position data into absolute position data;

a logically operating unit connected to said adjustment unit and to said storage unit for processing the graph image data and the statement image data with each other to generate composite image data; and a display unit connected to said logically operating unit and including the display screen for displaying a composite image such that each statement has a desired position on the graph image.

2. A device as defined in claim 1 wherein said statement input unit and said position input unit comprise a keyboard which is common to both of said input units.

3. A device as defined in claim 1 wherein said storage unit is operative for selectively storing measurement result data from a measurement device or previously generated composite image data from said logically operating unit.

4. A device as defined in claim 1 wherein said display unit comprises a CRT display, a plotter, and switch means for selectively connecting said logically operating unit to one of said CRT display and said plotter.

5. A device as defined in claim 1 further comprising a lead line input unit connected to said logically operating unit for supplying to said logically operating unit data representing lead lines to appear on the graph image.

6. A device as defined in claim 1 wherein said position input unit is selectively operable for inputting relative position data representative of the relative position of a statement with respect to the position of a selected feature of the graph image data.

* * * * *